US011224082B2

(12) United States Patent
Tsai

(10) Patent No.: US 11,224,082 B2
(45) Date of Patent: Jan. 11, 2022

(54) METHODS AND APPARATUS TO IMPROVE MR-DC SN ADDITION PROCEDURE

(71) Applicant: MEDIATEK INC., Hsinchu (TW)

(72) Inventor: Chun-Fan Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/789,010

(22) Filed: Feb. 12, 2020

(65) Prior Publication Data

US 2020/0267789 A1 Aug. 20, 2020

Related U.S. Application Data

(60) Provisional application No. 62/805,370, filed on Feb. 14, 2019.

(51) Int. Cl.
*H04W 76/15* (2018.01)
*H04L 5/00* (2006.01)
*H04W 74/08* (2009.01)
*H04W 76/27* (2018.01)

(52) U.S. Cl.
CPC .......... *H04W 76/15* (2018.02); *H04L 5/0055* (2013.01); *H04W 74/0833* (2013.01); *H04W 76/27* (2018.02)

(58) Field of Classification Search
CPC . H04W 76/15; H04W 76/27; H04W 74/0833; H04L 5/0055
See application file for complete search history.

(56) References Cited

U.S. PATENT DOCUMENTS

| 9,451,609 | B2 | 9/2016 | Fukuta et al. |
| 9,615,295 | B2* | 4/2017 | Kim ................. H04W 36/0055 |
| 9,622,239 | B2 | 4/2017 | Fukuta et al. |
| 9,820,332 | B2* | 11/2017 | Lee ..................... H04W 76/34 |

(Continued)

FOREIGN PATENT DOCUMENTS

| CN | 106465203 A | 2/2017 |
| CN | 107548166 A | 1/2018 |

(Continued)

OTHER PUBLICATIONS

International Search Report and Written Opinion dated Apr. 23, 2020 in PCT/CN2020/075219, 9 pages.

(Continued)

*Primary Examiner* — Michael J Moore, Jr.
(74) *Attorney, Agent, or Firm* — Oblon, McClelland, Maier & Neustadt, L.L.P.

(57) ABSTRACT

Aspects of the disclosure further provide an apparatus and various methods for wireless communications. The apparatus includes processing circuitry that can receive, from a first based station (BS), a first radio resource control (RRC) reconfiguration message including a conditional primary secondary cell (PSCell) addition command that indicates one or more candidate PSCells of a second BS. The processing circuitry can transmit, to the first BS, an RRC reconfiguration complete message that indicates completion of the conditional PSCell addition command. The processing circuitry can perform a conditional PSCell addition procedure to add a candidate target PSCell that is one of the one or more candidate PSCells of the second BS according to the conditional PSCell addition command.

20 Claims, 6 Drawing Sheets

(56) References Cited

U.S. PATENT DOCUMENTS

| | | |
|---|---|---|
| 9,844,047 B2 | 12/2017 | Fukuta et al. |
| 9,980,159 B2 | 5/2018 | Tseng |
| 2014/0220974 A1* | 8/2014 | Hsu ................... H04W 36/0058 |
| | | 455/436 |
| 2016/0029376 A1 | 1/2016 | Fukuta et al. |
| 2016/0095004 A1* | 3/2016 | Tseng .................... H04W 76/15 |
| | | 370/228 |
| 2016/0219604 A1* | 7/2016 | Fujishiro ............... H04W 36/04 |
| 2016/0338039 A1* | 11/2016 | Van Der Velde ........................... |
| | | H04W 74/0833 |
| 2016/0374077 A1 | 12/2016 | Fukuta et al. |
| 2017/0099621 A1* | 4/2017 | Michaelsen ....... H04W 36/0033 |
| 2017/0150384 A1* | 5/2017 | Rune ................... H04W 72/085 |
| 2017/0215185 A1 | 7/2017 | Fukuta et al. |
| 2018/0249331 A1* | 8/2018 | Chen .................... H04L 63/062 |
| 2018/0278357 A1* | 9/2018 | Kim ..................... H04J 11/0076 |
| 2018/0359790 A1* | 12/2018 | Ingale ................... H04W 28/16 |
| 2018/0368191 A1 | 12/2018 | Vutukuri et al. |
| 2019/0261235 A1* | 8/2019 | Yilmaz ............. H04W 36/0033 |
| 2019/0342932 A1* | 11/2019 | Futaki ................... H04W 76/15 |
| 2020/0022043 A1* | 1/2020 | Pelletier ............ H04W 36/0085 |
| 2020/0029389 A1* | 1/2020 | Yilmaz ................. H04W 76/27 |
| 2020/0053600 A1* | 2/2020 | Jang ....................... H04W 28/26 |
| 2020/0205050 A1* | 6/2020 | Shah ..................... H04W 36/22 |

FOREIGN PATENT DOCUMENTS

| | | |
|---|---|---|
| EP | 2 983 405 A1 | 2/2016 |
| EP | 3 416 436 A1 | 12/2018 |
| WO | WO 2018/128017 A1 | 7/2018 |

OTHER PUBLICATIONS

Combined Taiwanese Office Action and Search Report dated Dec. 25, 2020 in Patent Application No. 109104755 (with English translation of Category of Cited Documents), 6 pages.

* cited by examiner

METHODS AND APPARATUS TO IMPROVE MR-DC SN ADDITION PROCEDURE

INCORPORATION BY REFERENCE

This present disclosure claims the benefit of U.S. Provisional Application No. 62/805,370, "METHODS AND APPARATUS TO IMPROVE MR-DC SN ADDITION PROCEDURE" filed on Feb. 14, 2019, which is incorporated herein by reference in its entirety.

TECHNICAL FIELD

The present disclosure relates to wireless communications, and specifically relates to Multi-RAT Dual Connectivity (MR-DC) Secondary Node (SN) addition procedure.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

DC (Dual Connectivity) architecture is introduced in LTE Release 12 to increase throughput for UE. This architecture allows UE (User Equipment) to utilize radio resource of two nodes MN (Master Node) and SN (Secondary Node). MR-DC (Multi-RAT Dual Connectivity) architecture is further introduced in 5G. Under MR-DC architecture, UE can use radio resource provided by different RAT (Radio Access Technology). With MR-DC, MN functions as a controlling entity, utilizing SN for additional data capacity. For example, MR-DC configurations can include NR-DC (New Radio Dual Connectivity), EN-DC (E-UTRA—NR Dual Connectivity), NGEN-DC (NG-RAN—E-UTRA Dual Connectivity) and NE-DC (NR—E-UTRA Dual Connectivity).

SUMMARY

Aspects of the disclosure provide a method for wireless communication. Under the method, user equipment (UE) can receive, from a first base station (BS), a first radio resource control (RRC) reconfiguration message including a conditional primary secondary cell (PSCell) addition command that indicates one or more candidate PSCells of a second BS. The UE can transmit, to the first BS, an RRC reconfiguration complete message that indicates completion of the conditional PSCell addition command. The UE can further perform a conditional PSCell addition procedure to add a candidate target PSCell that is one of the one or more candidate PSCells of the second BS according to the conditional PSCell addition command.

According to aspects of the disclosure, the conditional PSCell addition command indicates a respective predefined condition for each of the one or more candidate PSCells. Under the method, the UE can perform the conditional PSCell addition procedure to add the candidate target PSCell when a corresponding predefined condition of the candidate target PSCell is satisfied.

In some embodiments, the conditional PSCell addition command indicates a respective threshold for each of the predefined conditions. Under the method, the UE can receive, from the first BS, a second RRC reconfiguration message including a configuration that configures the UE to measure qualities of the candidate PSCells of the second BS. The UE can further measure the qualities of the candidate PSCells, and performs the conditional PSCell addition procedure to add the candidate target PSCell when a measured quality of the candidate target PSCell is above a corresponding threshold of the candidate target PSCell. In an embodiment, the configuration in the second RRC reconfiguration message can be transferred within the first RRC reconfiguration message.

According to aspects of the disclosure, the conditional PSCell addition procedure can be a random access procedure. Under the method, the UE can transmit, to the first BS, an RRC message that indicates completion of the conditional PSCell addition procedure. In an embodiment, the UE can cancel the conditional PSCell addition command when a normal PSCell addition procedure is received from the first BS.

Aspects of the disclosure provide an apparatus for wireless communication. The apparatus includes processing circuitry that can receive, from a first based station (BS), a first radio resource control (RRC) reconfiguration message including a conditional primary secondary cell (PSCell) addition command that indicates one or more candidate PSCells of a second BS. The processing circuitry can transmit, to the first BS, an RRC reconfiguration complete message that indicates completion of the conditional PSCell addition command. The processing circuitry can perform a conditional PSCell addition procedure to add a candidate target PSCell that is one of the one or more candidate PSCells of the second BS according to the conditional PSCell addition command.

According to aspects of the disclosure, the conditional PSCell addition command indicates a respective predefined condition for each of the one or more candidate PSCells. The processing circuitry can perform the conditional PSCell addition procedure to add the candidate target PSCell when a corresponding predefined condition of the candidate target PSCell is satisfied.

In some embodiments, the conditional PSCell addition command indicates a respective threshold for each of the predefined conditions. The processing circuitry can receive, from the first BS, a second RRC reconfiguration message that configures the UE to measure qualities of the candidate PSCells of the second BS. The processing circuitry can further measure the qualities of the candidate PSCells, and perform the conditional PSCell addition procedure to add the candidate target PSCell when a measured quality of the candidate target PSCell is above a corresponding threshold of the candidate target PSCell. In an embodiment, the second RRC reconfiguration message can be transferred within the first configuration message.

According to aspects of the disclosure, the conditional PSCell addition procedure can be a random access procedure. In an embodiment, the processing circuitry can transmit, to the first BS, an RRC message that indicates completion of the conditional PSCell addition procedure. In an embodiment, the processing circuitry can cancel the conditional PSCell addition command when a normal PSCell addition procedure is received from the first BS.

Aspects of the disclosure provide a method for wireless communication. Under the method, a first base station (BS) can transmit, to a user equipment (UE), a first radio resource control (RRC) reconfiguration message including a conditional primary secondary cell (PSCell) addition command that indicates one or more candidate PSCells of a second BS and configures the UE to perform a conditional PSCell addition procedure to add a candidate target PSCell that is one of the one or more candidate PSCells. The first BS can receive, from the UE, an RRC reconfiguration complete message that indicates completion of the conditional PSCell addition command.

According to aspects of the disclosure, the first BS can receive, from the UE, an RRC message that indicates completion of the conditional PSCell addition procedure. Then the first BS can transmit, to the second BS, a message forwarding the RRC message.

According to aspects of the disclosure, the first BS can transmit, to the second BS, an addition request message that indicates the conditional PSCell addition procedure. Then the first BS can receive, from the second BS, an addition request acknowledgement (ACK) message.

In an embodiment, the first BS can transmit, to the UE, a second RRC reconfiguration message that configures the UE to measure qualities of the candidate PSCells of the second BS.

In an embodiment, the conditional PSCell addition command indicates a respective predefined condition for each of the one or more PSCells, and the conditional PSCell addition procedure is performed with the candidate target PSCell when a corresponding predefined condition of the candidate target PSCell is satisfied.

In an embodiment, the conditional PSCell addition procedure is a random access procedure.

Aspects of the disclosure further provide a non-transitory computer-readable medium which stores instructions implementing any one or a combination of the above methods for wireless communication.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
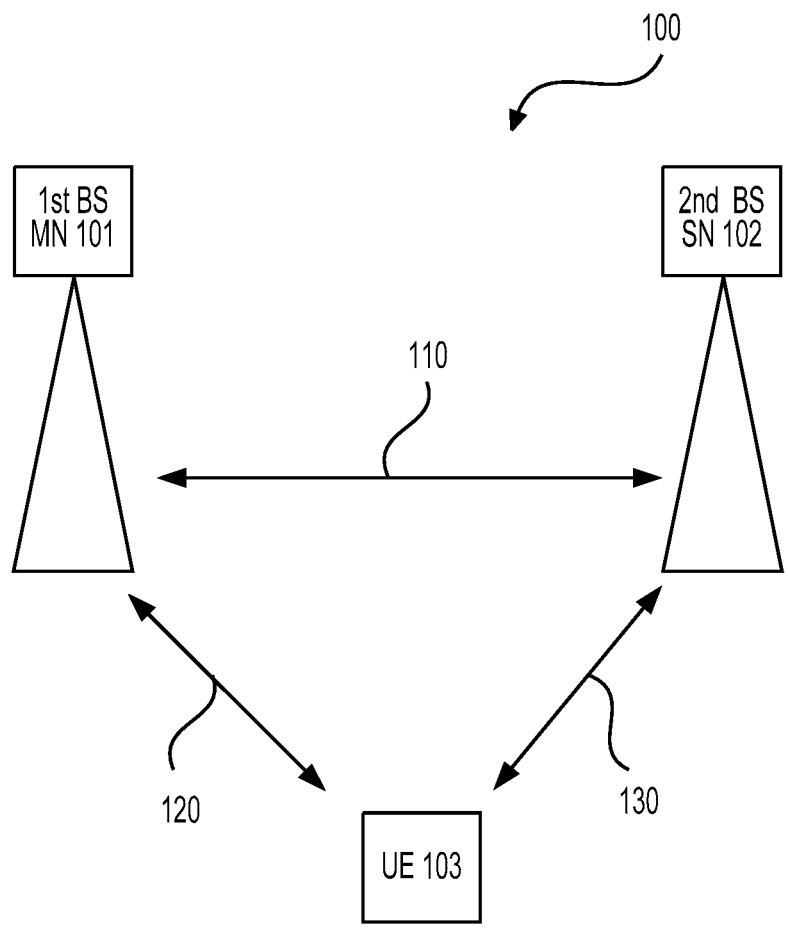
FIG. 1 shows an exemplary wireless communication system 100 performing dual connectivity operations according to an embodiment of the disclosure.

FIG. 1 shows an exemplary wireless communication system 100 performing dual connectivity (DC) operations according to an embodiment of the disclosure. In DC architecture, UE (User Equipment) can utilize radio resources of two RAN (Radio Access Network) nodes: MN (Master Node) and SN (Secondary Node). The MN and SN can be implemented by an eNB as specified in 3GPP LTE standards and/or a gNB as specified in 3GPP NR standards. In one example, both the MN and SN are implemented by the eNBs. In another example, both the MN and SN are implemented by the gNBs. In another example, the MN and SN are implemented by the eNB and gNB, respectively. In another example, the MN and SN are implemented by the gNB and eNB, respectively. Accordingly, under the DC architecture, the UE can use radio resources provided by different RAT (Radio Access Technology).

In the wireless system 100, a UE 103 performs DC operations with a first base station (BS) 101 functioning as an MN and a second BS 102 functioning as an SN. Under the DC configuration, the first BS 101 and the second BS 102 can perform transmission with each other through a connection 110, and the UE 103 can simultaneously perform transmissions with the first BS 101 and the second BS 102 through two connections 120 and 130, respectively. It is noted that the first BS 101 and the second BS 102 can perform scheduling independently.

Under DC operations, an MN (e.g., the first BS 101) may request one or more candidate primary secondary cells (PSCells) under control of an SN (e.g., the second BS 102) to be added for a specific UE (e.g., the UE 103).

Specifically, the MN may configure the UE to perform quality measurements for the one or more candidate PSCells under the control of the SN. The UE can then measure the qualities of the candidate PSCells under the control of the SN. The measure qualities may be RSRP (Reference Signal Received Power), RSRQ (Reference Signal Received Quality), SINR (Signal to Interference and Noise Ratio), or the like. The UE may report the measured qualities to the MN, which then decides a target PSCell to be added from the candidate PSCells under the control of the SN. After the target PSCell is determined, the MN can send a request to the SN for radio resource configuration of the target PSCell.

The SN may reject the request of the MN. However, if the SN admits the request, it will provide the radio resource configuration of the target PSCell to the MN. Then the MN can send an RRC reconfiguration message to the UE including the radio resource configuration of the target PSCell.

The UE may apply the radio resource configuration of the target PSCell in order to add the target PSCell into network. If the UE successfully applies the radio resource configuration, it can reply to the MN with an RRC reconfiguration complete message. However, if the UE fails to apply the radio resource configuration, it can reply to the MN with an RRC reconfiguration fail message. The MN may inform the SN the RRC reconfiguration complete/fail message.

If the radio resource configuration is successful applied, the UE can perform synchronization, such as through a random access procedure, with the target PSCell of the SN.

It is noted that the random access procedure towards the SN and the indication of RRC reconfiguration complete/fail message towards the MN can be performed independently.

In addition, the MN may take action to minimize service interruption due to activation of DC by initiating data forwarding towards the SN. The MN may also indicate to the SN the UE characteristics and capabilities, from which the SN can infer an amount of radio resources it is allowed to use.

Figure 2:
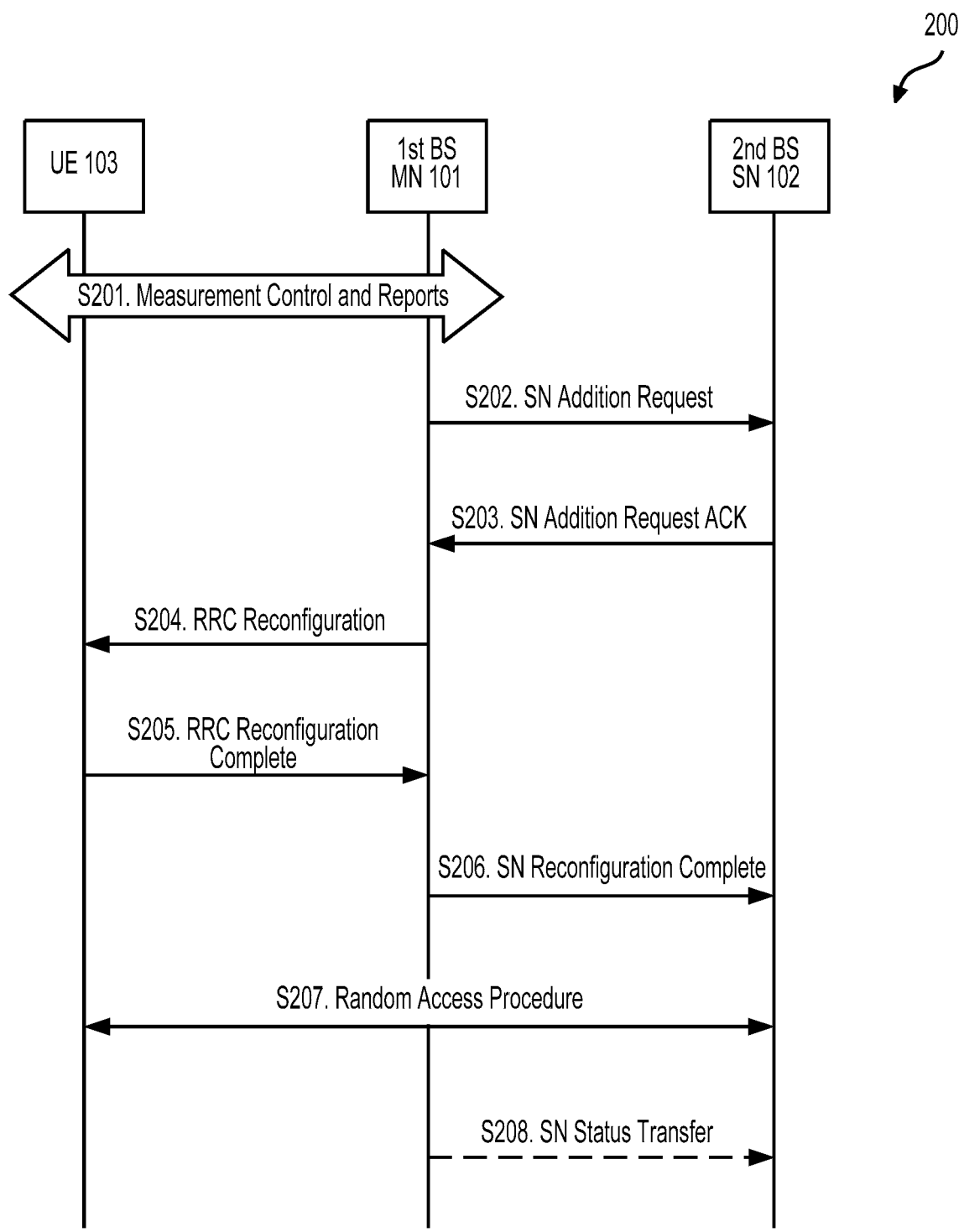
FIG. 2 shows an exemplary SN addition procedure 200 according to an embodiment of the disclosure.

FIG. 2 shows an exemplary SN addition procedure 200 according to an embodiment of the disclosure.

At step S201, the first BS 101 (i.e., the MN) configures the UE 103 to measure qualities of one or more candidate PSCells of the second BS 102 (i.e., the SN). The UE 103 measures the qualities of the candidate PSCells of the second BS 102 and reports the measured qualities to the first BS 101. The measured qualities can be RSRP, RSRQ, SINR, or the like. The first BS 101 determines a target PSCell from the one or more candidate PSCells based on the measurement report. Specifically, the MN may have a respective predefined condition for each of the candidate PSCells. The target PSCell can be determined from the PSCell(s) whose corresponding predefined conditions are satisfied. For example, the PSCell whose predefined condition is first satisfied can be determined as the target PSCell.

At step S202, the first BS 101 transmits an SN addition request message to the second BS 102. The SN addition request message requests the second BS 102 to provide radio resource configuration of the target PSCell.

At step 203, the second BS 102 transmits an SN addition request ACK (acknowledgement) message to the first BS 101. The SN addition request ACK message indicates to the first BS 101 that the SN addition request message has been received.

At step S204, the first BS 101 transmits an RRC (radio resource control) reconfiguration message to the UE 103. The RRC reconfiguration message carries an SN RRC reconfiguration message that indicates the radio resource configuration of the target PSCell.

At step S205, the UE 103 transmits an RRC reconfiguration complete message to the first BS 101. The RRC reconfiguration complete message carries an SN RRC reconfiguration complete message that indicates the radio resource configuration of the target PSCell has been configured with the UE 103.

At step S206, the first BS 101 transmits an SN reconfiguration complete message to the second BS 102. The SN reconfiguration complete message carries the SN RRC reconfiguration complete message that indicates the radio resource configuration of the target PSCell has been configured with the UE 103.

At step S207, the BS 103 performs synchronization, such as via RACH (random access channel), with the target PSCell of the second BS 102.

At step S208, the first BS 101 transmits an SN status transfer message to the second BS 102.

Since the step of requesting the radio resource configuration of the target PSCell (i.e., step S202) is performed after the step of measuring the qualities of the candidate PSCells (i.e., step S201), the total setup time of the SN addition procedure 200 may be long and thus can be optimized.

Table. 1 presents description and estimated time for each step of the SN addition procedure 200. The measurement delay in step S201 may be long, especially in FR2 (Frequency Range 2). Since the step S205.2 is mainly a low layer concern and the step S205.3 is basically configuration dependence, in order to reduce the time delay, the total setup time from the step S201 to step S205.1 can be optimized in protocol design.

TABLE 1

Description and time for each step
of the SN addition procedure 200

| Step | Description | Time (ms) |
|---|---|---|
| S201 | Measurement control and report | N * Tsmtc |
| S202, S203, S204 | SN Add procedure (Inter-node) | X |
| S205.1 | RRC Processing Delay | 20 |
| S205.2 | Target cell search, RF/AGC tuning | 62~567 |
| S205.3 | Delay to acquire first available PRACH in target gNB | $T_{PSCell\_DU}$ |
| S206 | SN reconfiguration complete | 0 |
| S207 | RACH procedure | Y |
| S208 | SN status transfer (Inter-node) | 0 |

Aspects of the disclosure present methods and apparatus for reducing the total setup time in MR-DC SN addition procedure.

In some deployment scenarios (e.g., the MN and SN are co-located), the MN can prepare the target PSCell earlier (i.e., without waiting the measurement report). Once some predefined conditions configured by the MN are satisfied, the UE can start the SN addition procedure and trigger RACH to the target PSCell. In such a scenario, the UE can perform the measurement in parallel with the SN addition procedure between MN and SN. Accordingly, the total setup time will be reduced.

Figure 3:
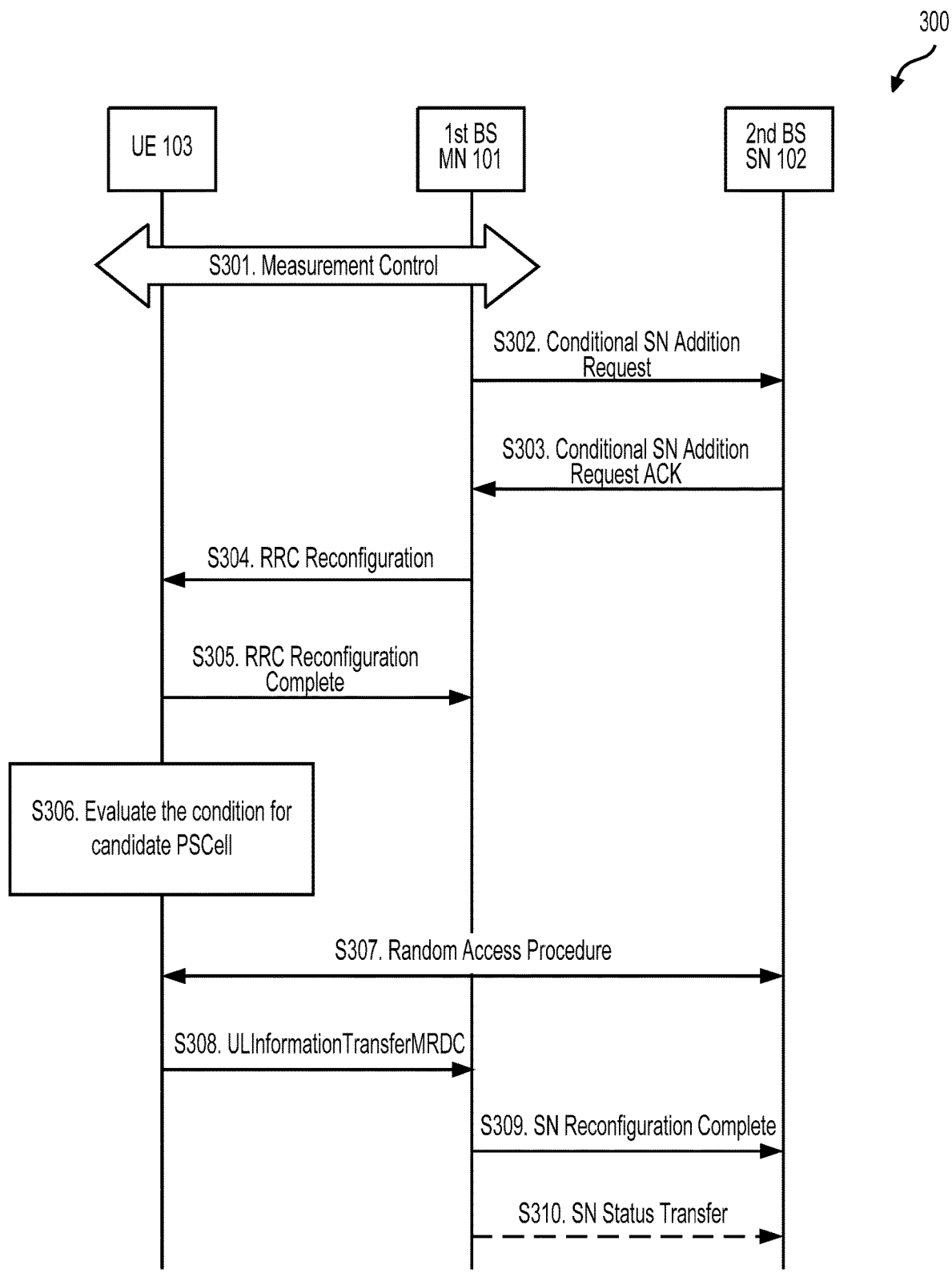
FIG. 3 shows another exemplary SN addition procedure 300 according to an embodiment of the disclosure.

FIG. 3 shows another exemplary SN addition procedure 300 according to an embodiment of the disclosure.

At step S301, the first BS 101 (i.e., MN) configures the UE 103 to measure qualities of neighbor cells including the candidate PSCell(s) of the second BS 102 (i.e., SN). The measured qualities can be RSRP, RSRQ, SINR, or the like.

At step S302, the first BS 101 transmits a conditional SN addition request message to the second BS 102. The conditional SN addition request message can request the second BS 102 to allocate radio resource configuration of the candidate PSCells of the BS 102.

At step S303, the second BS 102 transmits a conditional SN addition request ACK message to the first BS 101. The conditional SN additional request ACK message can indicate that the conditional SN addition request is received and accepted.

At step S304, the first BS 101 transmits an RRC reconfiguration message to the UE 103. The RRC reconfiguration message carries a conditional PSCell addition command that indicates the radio resource configuration of the candidate PSCells of the second BS 102. The conditional PSCell addition command can indicate a respective predefined condition for each of the candidate PSCells. The conditional PSCell addition command can further indicate a respective threshold for each predefined condition.

At step S305, the UE 103 transmits an RRC reconfiguration complete message to the first BS 101. The RRC reconfiguration complete message indicates completion of the conditional PSCell addition command to the first BS 101.

At step S306, the UE 103 evaluates the candidate PSCells according to the conditional PSCell addition command. Once a predefined condition of a specific candidate PSCell is satisfied, for example, the measured quality of the specific candidate is above a corresponding predefined threshold, the UE 103 can perform a conditional PSCell addition procedure to add the specific candidate PSCell into the network. The specific candidate PSCell is also referred to as the target PSCell. The conditional PSCell addition procedure includes synchronization with the target PSCell.

At step S307, the UE 103 performs synchronization and triggers RACH to the target PSCell to in order to perform a conditional PSCell addition procedure.

At step S308, the UE 103 transmits an ULInformationTransferMRDC message to the first BS 101. The ULInformationTransferMRDC message carries an SN RRC configuration complete message indicating that the conditional PSCell addition procedure is completed successfully.

At step S309, the first BS 101 transmits an SN reconfiguration complete message to the second BS 102. The SN reconfiguration complete message carries the SN RRC configuration complete message indicating that the conditional PSCell addition procedure is completed successfully.

At step S310, the first BS 101 transmits an SN status transfer message to the second BS 102.

In the SN addition procedure 300, the step of measuring the qualities of the cells (i.e., step S301) and the step of requesting the radio resource configuration of the target PSCell (i.e., step S302) can be performed in parallel, so that the total setup time can be reduced.

In addition, when a normal PSCell addition procedure (e.g., the SN addition procedure 200) is received, the UE 103 can cancel the conditional PSCell addition command in the SN addition procedure 300.

Figure 4:
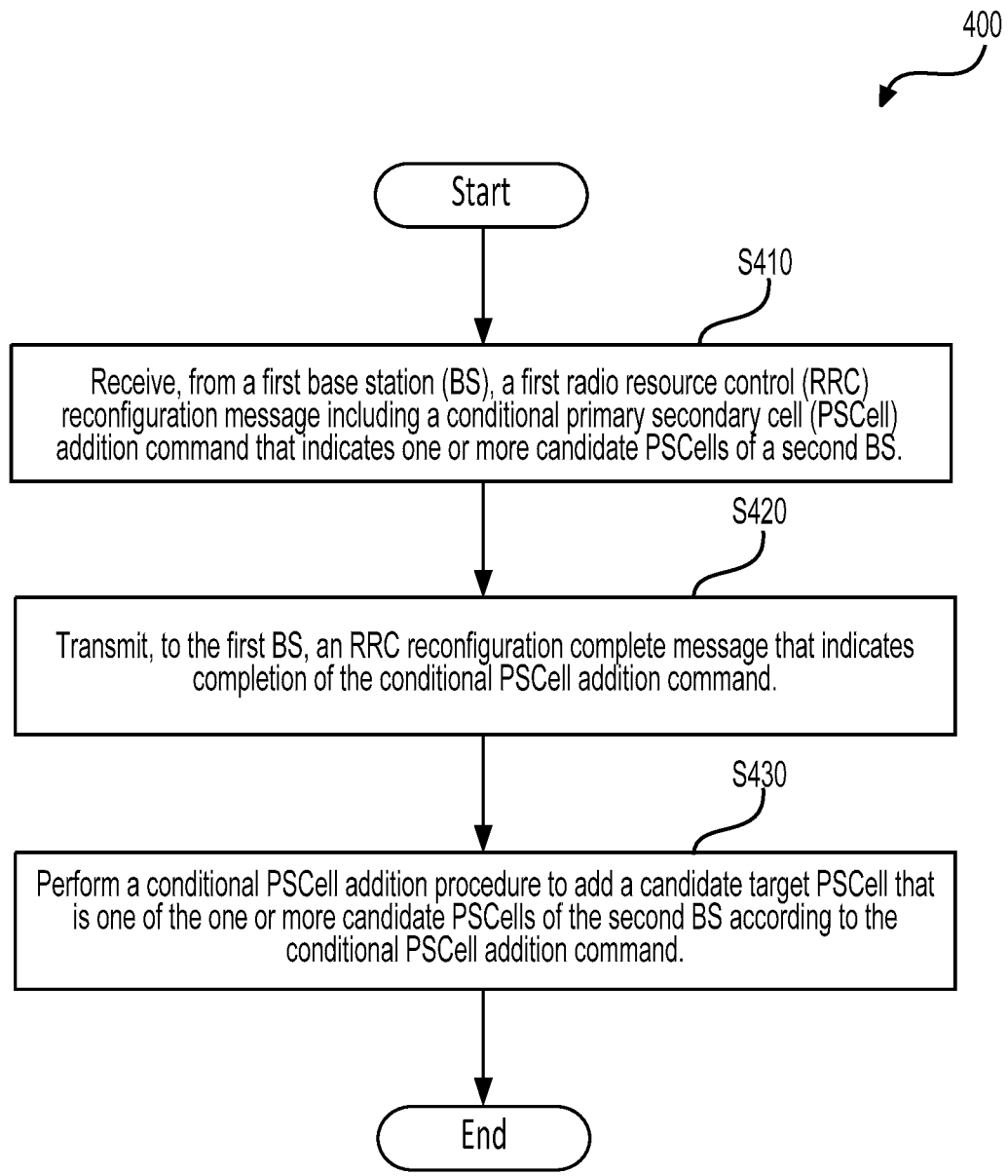
FIG. 4 shows a flowchart outlining an exemplary process 400 according to embodiments of the disclosure.

FIG. 4 shows a flowchart outlining an exemplary process 400 according to embodiments of the disclosure. In various embodiments, the process 400 is executed by processing circuitry, such as the processing circuitry in the UE 103. In some embodiments, the process 400 is implemented in software instructions, thus when the processing circuitry executes the software instructions, the processing circuitry performs the process 400.

The process 400 may generally start at step S410, where the process 400 receives, from a base station (BS), a first radio resource control (RRC) reconfiguration message including a conditional primary secondary cell (PSCell) addition command that indicates one or more candidate PSCells of a second BS. Then the process 400 proceeds to step S420.

At step S420, the process 400 transmits, to the first BS, an RRC reconfiguration complete message that indicates completion of the conditional PSCell addition command. Then the process 400 proceeds to step S430.

At step S430, the process 400 performs a conditional PSCell addition procedure to add a candidate target PSCell that is one of the one or more candidate PSCells of the second BS according to the conditional PSCell addition command. Then the process 400 terminates.

According to aspects of the disclosure, the conditional PSCell addition command indicates a respective predefined condition for each of the one or more candidate PSCells. When a corresponding predefined condition of the candidate target PSCell is satisfied, the process 400 performs the conditional PSCell addition procedure to add the candidate target PSCell.

In some embodiments, the conditional PSCell addition command indicates a respective threshold for each of the predefined conditions. The process 400 receives, from the first BS, a second RRC reconfiguration message including a configuration that configures the UE to measure qualities of the candidate PSCells of the second BS. The process 400 measures the qualities of the candidate PSCells, and performs the conditional PSCell addition procedure to add the candidate target PSCell when a measured quality of the candidate target PSCell is above a corresponding threshold of the candidate target PSCell. In an embodiment, the configuration in the second RRC reconfiguration message is transferred within the first RRC reconfiguration message.

According to aspects of the disclosure, the process 400 can transmit, to the first BS, an RRC message that indicates completion of the conditional PSCell addition procedure. When a normal PSCell addition procedure is received from the first BS, the process 400 can cancel the conditional PSCell addition command. In an embodiment, the conditional PSCell addition procedure can be a random access procedure.

Figure 5:
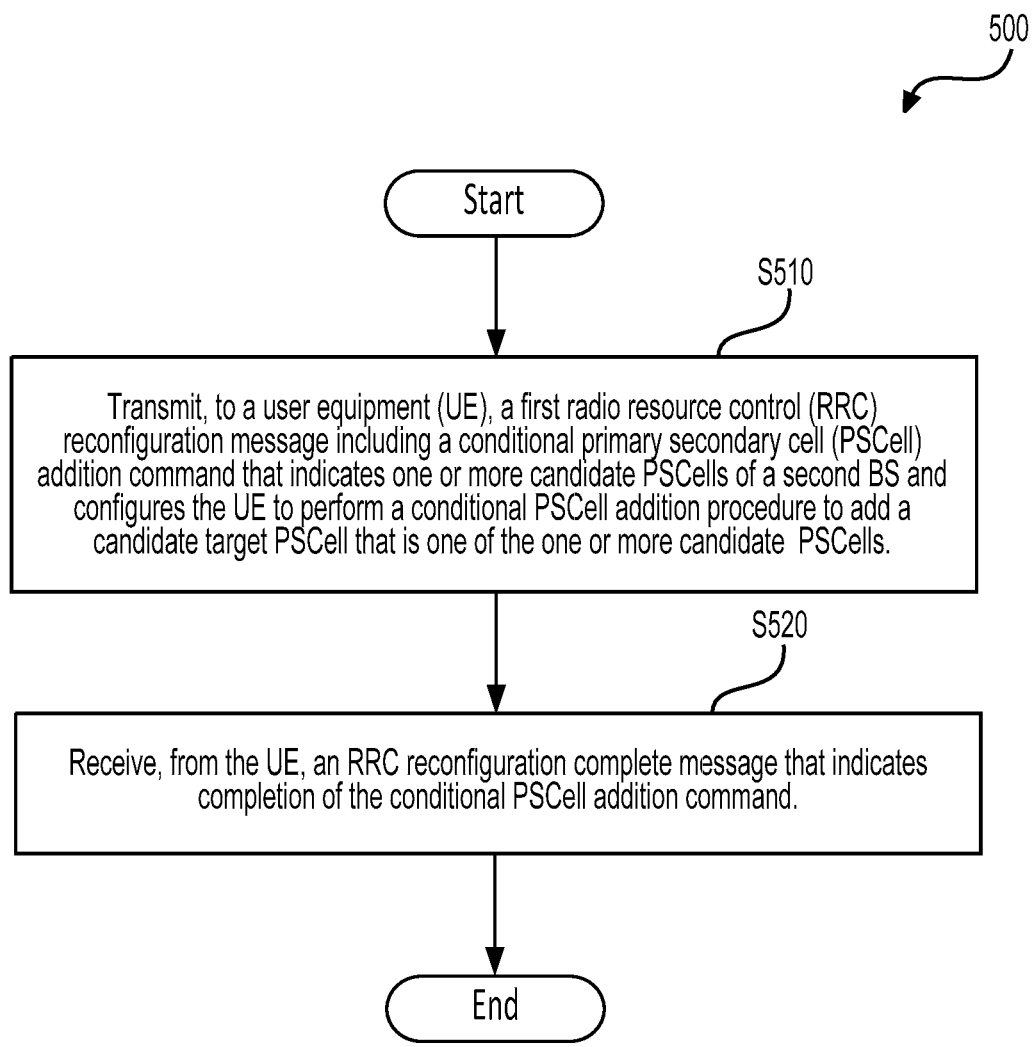
FIG. 5 shows another flowchart outlining an exemplary process 500 according to embodiments of the disclosure.

FIG. 5 shows another flowchart outlining an exemplary process 500 according to embodiments of the disclosure. In various embodiments, the process 500 is executed by processing circuitry, such as the processing circuitry in the first BS 101. In some embodiments, the process 500 is implemented in software instructions, thus when the processing circuitry executes the software instructions, the processing circuitry performs the process 500.

The process 500 may generally start at step S510, where the process 500 transmits, to a user equipment (UE), a first radio resource control (RRC) reconfiguration message including a conditional primary secondary cell (PSCell) addition command that indicates one or more candidate PSCells of a second BS and configures the UE to perform a conditional PSCell addition procedure to add a candidate target PSCell that is one of the one or more candidate PSCells. Then the process 500 proceeds to step S520.

At step S520, the process 500 receives, from the UE, an RRC reconfiguration complete message that indicates completion of the conditional PSCell addition command. Then the process 500 terminates.

According to aspects of the disclosure, the process 500 can receive, from the UE, an RRC message that indicates completion of the conditional PSCell addition procedure. The process 500 can further transmit, to the second BS, a message forwarding the RRC message.

In some embodiments, the process 500 can transmit, to the second BS, an addition request message that indicates the conditional PSCell addition procedure. Then the process 500 can receive, from the second BS, an addition request acknowledgement (ACK) message.

In some embodiments, the process 500 can transmit, to the UE, a second RRC reconfiguration message that configures the UE to measure qualities of the candidate PSCells of the second BS.

In some embodiments, the conditional PSCell addition command indicates a respective predefined condition for each of the one or more PSCells, and the conditional PSCell addition procedure can be performed with the candidate target PSCell when a corresponding predefined condition of the candidate target PSCell is satisfied.

In some embodiments, the conditional PSCell addition procedure can be a random access procedure.

Figure 6:
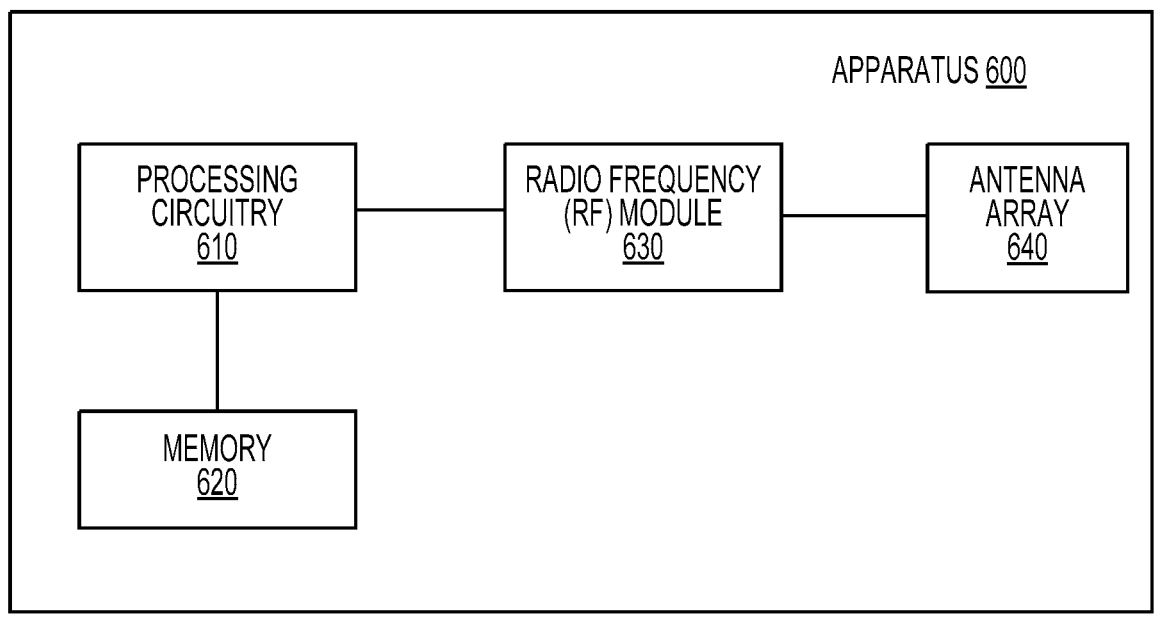
FIG. 6 shows an exemplary apparatus 600 according to embodiments of the disclosure.

FIG. 6 shows an exemplary apparatus 600 according to embodiments of the disclosure. The apparatus 600 can be configured to perform various functions in accordance with one or more embodiments or examples described herein. Thus, the apparatus 600 can provide means for implementation of techniques, processes, functions, components, and systems described herein. For example, the apparatus 600 can be used to implement functions of the BS 103 in various embodiments and examples described herein. The apparatus 600 can include a general purpose processor or specially designed circuits to implement various functions, components, or processes described herein in various embodiments. The apparatus 600 can include processing circuitry 610, a memory 620, a radio frequency (RF) module 630, and an antenna array 640.

In various examples, the processing circuitry 610 can include circuitry configured to perform the functions and processes described herein in combination with software or without software. In various examples, the processing circuitry 610 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 610 can be a central processing unit (CPU) configured to execute program instructions to perform various functions and processes described herein. Accordingly, the memory 620 can be configured to store program instructions. The processing circuitry 610, when executing the program instructions, can perform the functions and processes. The memory 620 can further store other programs or data, such as operating systems, application programs, and the like. The memory 620 can include a read only memory (ROM), a random access memory (RAM), a flash memory, a solid state memory, a hard disk drive, an optical disk drive, and the like.

The RF module 630 receives a processed data signal from the processing circuitry 610 and converts the data signal to a wireless signal that is then transmitted via the antenna array 640, or vice versa. The RF module 630 can include a digital to analog convertor (DAC), an analog to digital converter (ADC), a frequency up convertor, a frequency down converter, filters and amplifiers for reception and transmission operations. The RF module 630 can include multi-antenna circuitry for beamforming operations. For example, the multi-antenna circuitry can include an uplink spatial filter circuit, and a downlink spatial filter circuit for shifting analog signal phases or scaling analog signal amplitudes.

The apparatus 600 can optionally include other components, such as input and output devices, additional or signal processing circuitry, and the like. Accordingly, the apparatus 600 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method of wireless communication at a user equipment (UE), the method comprising:
   receiving, from a first base station (BS), a first radio resource control (RRC) reconfiguration message including a conditional primary secondary cell (PSCell) addition command that indicates one or more candidate PSCells of a second BS;
   transmitting, to the first BS, an RRC reconfiguration complete message that indicates completion of the conditional PSCell addition command;
   determining a candidate target PSCell in the one or more candidate PSCells of the second BS based on the conditional PSCell addition command; and
   performing a conditional PSCell addition procedure to add the candidate target PSCell.

2. The method of claim 1, wherein the conditional PSCell addition command indicates a respective predefined condition for each of the one or more candidate PSCells, and the performing includes performing the conditional PSCell addition procedure to add the candidate target PSCell when a corresponding predefined condition of the candidate target PSCell is satisfied.

3. The method of claim 2, wherein the conditional PSCell addition command indicates a respective threshold for each of the predefined conditions, and the method further comprises:
   receiving, from the first BS, a second RRC reconfiguration message including a configuration that configures the UE to measure qualities of the candidate PSCells of the second BS; and
   measuring the qualities of the candidate PSCells, wherein the performing further includes performing the conditional PSCell addition procedure to add the candidate target PSCell when a measured quality of the candidate target PSCell is above a corresponding threshold of the candidate target PSCell.

4. The method of claim 3, wherein the configuration in the second RRC reconfiguration message is transferred within the first RRC reconfiguration message.

5. The method of claim 1, further comprising:
   transmitting, to the first BS, an RRC message that indicates completion of the conditional PSCell addition procedure.

6. The method of claim 1, further comprising:
   canceling the conditional PSCell addition command when a normal PSCell addition procedure is received from the first BS.

7. The method of claim 1, wherein the conditional PSCell addition procedure is a random access procedure.

8. An apparatus, comprising processing circuitry configured to:
   receive, from a first base station (BS), a first radio resource control (RRC) reconfiguration message including a conditional primary secondary cell (PSCell) addition command that indicates one or more candidate PSCells of a second BS;
   transmit, to the first BS, an RRC reconfiguration complete message that indicates completion of the conditional PSCell addition command;
   determining a candidate target PSCell in the one or more candidate PSCells of the second BS based on the conditional PSCell addition command; and
   perform a conditional PSCell addition procedure to add the candidate target PSCell.

9. The apparatus of claim 8, wherein the conditional PSCell addition command indicates a respective predefined condition for each of the one or more candidate PSCells, and the processing circuitry is further configured to:
perform the conditional PSCell addition procedure to add the candidate target PSCell when a corresponding predefined condition of the candidate target PSCell is satisfied.

10. The apparatus of claim 9, wherein the conditional PSCell addition command indicates a respective threshold for each of the predefined conditions, and the processing circuitry is further configured to:
receive, from the first BS, a second RRC reconfiguration message that configures the UE to measure qualities of the candidate PSCells of the second BS;
measure the qualities of the candidate PSCells; and
perform the conditional PSCell addition procedure to add the candidate target PSCell when a measured quality of the candidate target PSCell is above a corresponding threshold of the candidate target PSCell.

11. The apparatus of claim 10, wherein the second RRC reconfiguration message is transferred within the first configuration message.

12. The apparatus of claim 8, wherein the processing circuitry is further configured to:
transmit, to the first BS, an RRC message that indicates completion of the conditional PSCell addition procedure.

13. The apparatus of claim 8, wherein the processing circuitry is further configured to:
cancel the conditional PSCell addition command when a normal PSCell addition procedure is received from the first BS.

14. The apparatus of claim 8, wherein the conditional PSCell addition procedure is a random access procedure.

15. A method of wireless communication at a first base station (BS), the method comprising:
transmitting, to a user equipment (UE), a first radio resource control (RRC) reconfiguration message including a conditional primary secondary cell (PSCell) addition command that indicates one or more candidate PSCells of a second BS and configures the UE to perform a conditional PSCell addition procedure to add a candidate target PSCell that is one of the one or more candidate PSCells and determined by the UE; and
receiving, from the UE, an RRC reconfiguration complete message that indicates completion of the conditional PSCell addition command.

16. The method of claim 15, further comprising:
receiving, from the UE, an RRC message that indicates completion of the conditional PSCell addition procedure; and
transmitting, to the second BS, a message forwarding the RRC message.

17. The method of claim 15, further comprising:
transmitting, to the second BS, an addition request message that indicates the conditional PSCell addition procedure; and
receiving, from the second BS, an addition request acknowledgement (ACK) message.

18. The method of claim 15, further comprising:
transmitting, to the UE, a second RRC reconfiguration message that configures the UE to measure qualities of the candidate PSCells of the second BS.

19. The method of claim 15, wherein the conditional PSCell addition command indicates a respective predefined condition for each of the one or more PSCells, and the conditional PSCell addition procedure is performed with the candidate target PSCell when a corresponding predefined condition of the candidate target PSCell is satisfied.

20. The method of claim 15, wherein the conditional PSCell addition procedure is a random access procedure.

* * * * *